US010130195B2

(12) United States Patent
Phillips et al.

(10) Patent No.: US 10,130,195 B2
(45) Date of Patent: Nov. 20, 2018

(54) SYSTEM AND METHOD FOR SMART RETAIL DISPLAY (71) Applicant: R. J. Reynolds Tobacco Company, Winston-Salem, NC (US)

(72) Inventors: Percy D. Phillips, Winston-Salem, NC (US); Andries D. Sebastian, Winston-Salem, NC (US); Ercilia Hernandez, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 431 days.

(21) Appl. No.: 14/947,747

(22) Filed: Nov. 20, 2015

(65) Prior Publication Data
US 2017/0148077 A1 May 25, 2017

(51) Int. Cl.
G06Q 30/00 (2012.01)
A47F 5/00 (2006.01)
G06Q 30/06 (2012.01)
G06Q 10/08 (2012.01)
G06F 3/14 (2006.01)
H04W 4/80 (2018.01)
G09F 3/02 (2006.01)

(52) U.S. Cl.
CPC .............. A47F 5/0018 (2013.01); A47F 5/00 (2013.01); G06F 3/1423 (2013.01); G06Q 10/08 (2013.01); G06Q 10/087 (2013.01); G06Q 30/0623 (2013.01); G06Q 30/0639 (2013.01); H04W 4/80 (2018.02); G09F 2003/0219 (2013.01)

(58) Field of Classification Search
CPC ................... G06Q 30/00; G06Q 30/06; G06Q 30/0601–30/0643; G06Q 30/08; G06Q 10/087; G06F 3/1423; G06F 3/1446; G06F 3/1462; G06F 3/147
See application file for complete search history.

(56) References Cited

U.S. PATENT DOCUMENTS 9,031,872 B1 * 5/2015 Foster .................... G06F 3/147
340/5.91
2002/0109593 A1 * 8/2002 Swartzel .............. G06Q 10/087
340/540

(Continued)

FOREIGN PATENT DOCUMENTS

EP 2402929 1/2012
WO 2013153282 10/2013

OTHER PUBLICATIONS

Real-Time Bitcoin Price Tag Hits the High Street. Pete Rizzo Feb. 4, 2014. (Year: 2014).*

(Continued)

Primary Examiner — William J Allen
(74) Attorney, Agent, or Firm — Middleton Reutlinger (57) ABSTRACT The present system relates to methods and apparatus for displaying retail information. Specially, the present system provides a system for displaying retail information specified by a retailer or a consumer and real-time monitoring of retail product for the retailer. For example, this allows a retailer to send promotional offers to a consumer operated external device, the retailer to keep real-time inventory of products, and the consumer to request the location of a product in a retail outlet. Additionally, the described system provides methods and apparatus for theft detection of a retail product.

18 Claims, 6 Drawing Sheets (56) References Cited

U.S. PATENT DOCUMENTS

| | | |
|---|---|---|
| 2006/0279527 A1 | 12/2006 | Zehner et al. |
| 2012/0274470 A1* | 11/2012 | Sandvick ................. G08B 5/36 340/584 |
| 2015/0041616 A1* | 2/2015 | Gentile ................ G06Q 10/087 248/550 |
| 2015/0095129 A1 | 4/2015 | Daigle |
| 2015/0278897 A1* | 10/2015 | Nichols ............. G06Q 30/0613 705/26.41 |
| 2016/0026032 A1* | 1/2016 | Moore ............... G06K 7/10316 382/103 |
| 2016/0106236 A1* | 4/2016 | Kwiatek ................. A47F 11/06 108/50.11 |
| 2016/0350703 A1* | 12/2016 | Sundholm .......... G06Q 30/0206 |
| 2017/0265657 A1* | 9/2017 | Kurig ..................... A47F 10/00 |

OTHER PUBLICATIONS

International Search Report for corresponding PCT Application No. PCT/US2016/062466, dated Mar. 27, 2017.

\* cited by examiner

SYSTEM AND METHOD FOR SMART RETAIL DISPLAY

FIELD OF THE INVENTION

The present system and method is related to display and retail information systems for displaying product and other related information. Specially, the presently described system relates to a smart retail display that allows for the control and display of retail information and real-time monitoring of retail product by utilizing near field communication. Additionally, it further relates to methods and apparatus for providing information to the consumer and also related to theft detection of retail products.

BACKGROUND

Retail outlets such as department stores, discount stores, supermarkets, etc. sell various products ranging from electrical appliances to food. Globally, the largest retail outlets employ diverse strategies to attract consumers and obtain their business and convey relevant information to the consumer. Maintaining a positive relationship with a consumer and providing relevant information for a better shopping experience is a goal for any retail outlet in an effort to retain the consumer. Providing the consumer with information relating to promotional offers and the condition of a product in question is a way to achieve this goal.

There exists many challenges in the retail industry which include conveying promotional offers to attract more consumers, keeping track of inventory to know which products are popular or which products need to be ordered from a manufacturer, and staying competitive with other retail outlets. Further, there exists the challenge of detecting and preventing theft in real-time at a retail outlet. Thus the system described in the below sets out various embodiments is developed in an effort to address these challenges.

A planogram is a diagram that indicates the placement of products on a retail shelf and when a manufacturer sends a new product line to a retail outlet, the product line is accompanied with a planogram. Planograms provide a visual method of product positioning by placing products in strategic, pre-allocated positions on a shelf in a retail outlet. These planograms are created to enable consistent product placement and representation across various retail outlets and are arranged so that consumers are visually drawn to particular products within the arrangement.

Another method of product promotion to the consumer is with a promotional offer. The promotional offer may be made available to consumers if the particular product is about to expire, the particular product is about to be outdated due to the release of a new model, the particular product needs to be sold after the holiday season, etc. Promotional offers are often physically displayed alongside the particular product which the promotional offer is for and are static displays listing the dollar amount or percentage the consumer will save on said particular product.

Current retail theft detection schemes are commonly comprised of three main components, an electronic antenna or other communication link to detect an activated tag or label upon a consumer exiting the store, a deactivator or detector pad to deactivate a tag or label, and the physical electronic tag attached to the product. See, for example, Retail Theft Prevention's Electronic Article Surveillance (EAS) System Anti-shoplifting Security System. These systems are efficient; however, there exists a need for improvement upon them. At the point of sale, each purchased product is verified as sold and an electronic tag or label is deactivated to prevent a theft detection scheme discussed hereinafter from alerting a retailer of a theft after a valid sale.

Radio-frequency identification (RFID) technology utilizes electromagnetic fields to transfer data and the associated RFID tag or label can be either active or passive. An active RFID tag or label has a power source which allows transmission from the RFID tag or label to a RFID reader, whereas a passive RFID tag or label does not require a power source and the RFID tag or label is read by a RFID reader. RFID systems are classified by the type of tag or label and the reader they utilize, i.e. whether the RFID tag or label and/or the RFID is either active or passive. The tag or label is embedded within a particular product and consists of at least two parts: an integrated circuit for processing and storing information and for modulating and demodulating a radio-frequency (RF) signal; and an antenna and transceiver or EMF generator may be provided for transmitting and receiving the RF signal. RFID readers communicate with RFID tags by transmitting and receiving encoded RF signals that contain a corresponding tags unique identifier and additional product-related information specified by a user. The unique identifier may be at least one of a serial number or the product-related information may be data collected by a plurality of sensors. Due to unique identifiers, the RFID system is able differentiate different products and the product-related data when the RFID tag is within the range of the RFID reader.

RFID systems are classified by the type of tag or label and the type of reader the system utilizes which include: a passive reader active tag (PRAT) system; an active reader passive tag (ARPT); and an active reader active tag (ARAT). Passive reader passive tag (PRPT) systems are not implemented in because either the RFID tag or RFID reader must be active for communication between them to occur. RFID tags or labels are small in size and embedding them within a product for tracking is well-known in the art. RFID systems are already employed in a diverse number of fields which include: airport baggage tracking, tracking of animals, and collecting road tolls. RFID frequency bands begin at 120 kilohertz (kHz) and extend to 10 gigahertz (GHz). Near field communication (NFC) is a sub-set of RFID technology which operates at 13.56 megahertz (MHz) and will be discussed hereinafter; therefore, the same classification based on the type of tag or label and the type of reader can be applied to NFC systems.

NFC is a form of high frequency RFID communication that allows at least two devices to communicate with one another when they are within a particular proximity of one another. Like RFID systems, NFC systems utilize electromagnetic fields to transfer data both to and from one device to another device and can be either active or passive. NFC is typically considered a short-range wireless technology which allows for peer-to-peer communication; however, large NFC networks can be created by the strategic placement of NFC tags and readers. Additionally, a smartphone, a smart watch, a tablet, or any device that utilizes NFC, WLAN, or any other communication link equipped with a NFC tag may utilize NFC as a primary method of communications.

Conductive ink is an ink that can be printed onto an object and conduct electricity. Conductive ink may be classified as either fired high solids systems or polymer thick film systems. Materials such as silver flakes and carbon are often used in conductive inks to achieve conductivity. This stateof-the-art technology provides an economic and innovative method for use in the retail industry and can also be used to print RFID tags or labels.

BRIEF SUMMARY

The present disclosure is generally directed to methods and apparatus that adapt displaying retail information and control of a smart retail display system based on receiving environmental data of a smart product package (referred to hereinafter as a product package) located on a smart near field communication (NFC) retail shelf (referred to hereinafter as a smart NFC shelf or simply NFC shelf) which accommodates various product packages. The smart retail display system relates to technology which allows transmission of personalized messages, promotional offers, sale verification, etc. to both a consumer and a retailer alike. The smart retail display system has at least four components, wherein the components include: said product package with a conductive ink tag, NFC tag, or radio-frequency identification (RFID) tag, a plurality of sensors, and a smart product package display (referred to hereinafter as a product package display); said NFC shelf with a control system, a plurality of sensors, and a smart display (referred to hereinafter as a smart NFC shelf display or simply NFC shelf display); a database of unique product identifiers to collect, analyze, and store data related to the retail product; and a consumer operated external device which may be a smartphone, a smart watch, a tablet, or any device that utilizes NFC, wireless local area network (WLAN) communication, or any other communication link. In addition, the NFC shelf facilitates NFC, WLAN communication, or any other communication link between the four or more components disclosed herein.

By communication link it is meant that any device having a communication link may be in digital or other communication with any other part of the system via a wireless or wired communication protocol. Such communication link can be active or passive. The communication link may be between two elements or may be supported by a separate networking system and may be provided to optionally transfer data between a product package display or the product packages, a smart shelf or other inventory type control system, a database, a consumer operated external display device, wireless local area network (WLAN), or any other communication strategy. Communication link herein can simply imply the use of various technology to transfer data from one element of the system to another, whether initiated by the sending device, receiving device, interrogation or by a control system. Further, the communication links described herein may be integrated within the various elements such as labels, packaging, displays, shelf structure technology and the like or alternatively may be separated electronics. Thus, communication link could alternatively range from transceivers to simple memory locations which store data or which respond to interrogators, thereby becoming active only in the presence of an energy field. Communication link may also mean a dedicated storage area which may be read by an external device.

This method and other implementations of technology disclosed herein may each optionally comprise one or more of the following features.

A NFC shelf control system is comprised of at least three components: a memory to store a plurality of commands for the system to execute; a controller which may be, but is not limited to a microprocessor to execute the stored plurality of commands in the memory; and a transponder antenna or other communication link to facilitate transmission of data between a product package, the NFC shelf, a database of unique product identifiers, and a consumer operated external device, wherein the near field communication shelf control system is operable to transmit display information to the product package display and the NFC shelf display. The control system enables a smart retail display system to operate with minimal retailer intervention. For example, a retailer may want the system to respond to a product expiring by commanding an alert be sent to a consumer not to purchase said product via a product package display. A microprocessor is coupled to a plurality of NFC shelves and at least one or more microprocessors are utilized for control of a plurality of NFC shelves.

A smart retail display system may utilize a conductive ink tag, a NFC tag, or more generally a RFID tag embedded within a product package to collect, analyze, and store product-related data associated with the particular product. For example, a product package may include an embedded NFC tag which tracks the product to a point of sale and once purchased, the tag registers sales verification to the tags corresponding unique product identifier in a database of unique product identifiers. Some further examples include real-time monitoring of inventory and real-time product tracking which allow a retailer to track a particular product and a consumer to find a particular product in a retail outlet, respectively.

A product package includes a plurality of sensors, wherein the plurality of sensors may be, but are not limited to a temperature sensor, a humidity sensor, and a timing sensor. The plurality of sensors allow for product-related environmental data to be collected, analyzed, and stored in a database of unique product identifiers via NFC, WLAN or any other communication link. Additionally, product-related environmental data may be displayed on the product package for a consumer to examine and allow said consumer to make an informed purchasing decision. For example, a product package may contain a filet of salmon and the sensor data displayed on the product package may include how long the fish has been packaged and stocked on the NFC shelf which allows the consumer to select the freshest filet of salmon for purchase.

Some implementations are generally directed to adapting control of a display of a product package based on product-related environmental data, wherein a method of display may be a liquid crystal display (LCD), a active-matrix organic light-emitting diode (AMOLED) display, a light-emitting diode (LED) display, or any other display commonly used in the art. For example, a product package may receive and display the current temperature or historical temperature of the product and the amount of time the product package has been stocked on the NFC shelf from sensory data and advise whether the product is safe for a consumer to ingest from said data. A plurality of sensory data provided by a product package, in conjunction with a plurality of sensory data provided by a NFC shelf, may further identify when a product is about to expire and command the display of a promotional offer to a consumer so said product is not wasted.

Utilizing an active conductive ink tag, NFC tag, or RFID tag is utilized herein as it allows the tag to behave as both a receiver and a transmitter simultaneously that communicates between at least one NFC shelf display and the product package, wherein there exists at least one product package location on the NFC shelf display, via the transponder antenna or other communication link of the NFC shelf control system. The simultaneous reception and transmission of data allows for a product package display and a NFC shelf display to be dynamically updated as product-related environmental data updates and time data updates. For example, a product contained in a product package that has a shelf life of ten days may be on a shelf for eight days. A product package display may have displayed the count down for the first five days in the color green displayed the count down for the past three days in the color yellow, and display the count down for the final two days of the products shelf life in red indicating that the product within the product package is about to expire.

In some implementations, the product package display may dynamically count down in a "DAY:HOUR:MINUTE:SECOND" format to provide a consumer with an numerical indication as to how much longer until the product expires. In other implementations, a visual representation, such as a circle whose perimeter contains 10 segments, wherein each segment represents a day, may dynamically count down a 10 day shelf life of a product package by dulling each segment dynamically in sequential order as time data updates. The data represented on the product package display is commanded by a NFC shelf control system and received by a conductive ink tag, NFC tag, or RFID tag, wherein the received data is displayed. There exists a plurality of ways to represent data on the product package display, but one of skill in the art will recognize that the various embodiments apply equally regardless of the method of display and dynamic representation of data.

In some implementations, a method is provided that comprises receiving, by a motion detector and/or a pressure detector, an indication a product package is removed from a NFC shelf which may trigger one of a plurality of commands. For example, a consumer may select a product package and remove it from a NFC shelf which commands a personalized message to display on said NFC shelf or a consumer operated external device for the consumer to view. Further, if a product package is removed from a NFC shelf, then a database of unique product identifiers registers the removal of said product package and a retailer will know when shelf stock of said product package needs to be replenished.

Some implementations are generally directed to adapting control of a display of a NFC shelf based on a retailer's preference, wherein a method of display may be, but is not limited to a LCD, a AMOLED display, a LED display, or any other display commonly used in the art. For example, a NFC shelf which houses a particular product may receive a request from a consumer looking for said particular product and command the NFC shelf to display a personalized image which allows the consumer to locate said particular product. The consumer may interface with a smart retail display system via a consumer operated external device such as a smartphone, a smart watch, a tablet, or any device that utilizes NFC, WLAN, or any other communication link.

As with the product package display, the NFC shelf display also represents data and information that is dynamically changing via data received from the transponder antenna or other communication means of the shelf control system. For example, if a consumer removes a product package from a NFC shelf, then a motion and/or a pressure detector will sense said product package is removed, the transmission of a signal will be commanded by a NFC shelf control system to a database of unique product identifiers, wherein the removal of said product package is registered and the transmission of a message (e.g. "BUY ME!") is commanded to said product package display for the consumer to view. Further, the removal of a product package from a NFC shelf may trigger one of a plurality of commands to be executed by a NFC shelf control system. For example, if a consumer removes a product package from a NFC shelf, the NFC shelf display may dynamically be updated to provide the consumer with a promotional offer for the product package said consumer removed. There exists a plurality of ways to represent data on the product package display, but one of skill in the art will recognize that the various embodiments apply equally regardless of the method of display and dynamic representation of data.

Some implementations are generally directed to adapting control of a product package display from either an in-house or remote location. A product package continually collects product-related environmental data via a plurality of sensors embedded within a product package and transmits said product-related environmental data to a database of unique product identifiers via a transponder antenna or other communication link on a NFC shelf where said data is analyzed and stored. A database of unique product identifiers may be located on a personal computer, a laptop, and/or a tablet which continually processes said data for a product package throughout said product package lifespan, including after purchase. Each product packages' conductive ink tag, NFC tag, or RFID tag is associated with a unique product identifier which enables a retailer to analyze trends of product purchasing from a consumer viewpoint.

In addition to processing data from a plurality of sensors corresponding to both a product package and a NFC shelf, a database of unique product identifiers may also provide point of sale verification and aid the retailer in keeping real-time inventory. Once a product is purchased, sale verification is passed along to the conductive ink tag, NFC tag, or RFID tag associated with said products unique identifier which is used to prevent theft as described hereinafter. Tracking inventory is often a time-consuming and monotonous task that retailers must perform to ensure they have enough stock of a particular product. The various embodiments allow inventory to be kept in real-time by registering a product has been purchased and subtracting that product from the current inventory.

In some implementations, a database of unique product identifiers may also be utilized to allow a retailer to organize, sort, and manage products by their unique identifiers. For example, a retailer may want to organize products in the database by a particular planogram which will allow the retailer to analyze which particular products and what quantity of the particular products need to be stocked in a particular area of a retail outlet. Further, a retailer may sort real-time inventory by products provided by a particular manufacturer to allow the retailer to view which products need to be ordered from the particular manufacturer. Even further, a retailer may command the transmission of a image or a message to a NFC shelf display alerting a employee of a retail outlet that a particular product on the NFC shelf needs to be stocked.

In some implementations, a database of unique product identifiers may also be utilized to track product sales without the need of additional accounting software. For example, once a particular product is sold, a database of unique product identifiers will be commanded to append sales verification to said products unique identifier. This allows a retailer to view which products have been sold, at what cost each product was sold, and the total amount of sales for that day or any retailer specified time period the retailer desires to examine.

A consumer operated external device allows a consumer to communicate with a smart retail display system via NFC, WLAN, or any other communication link. A consumer application for a smartphone, a smart watch, a tablet, or any device that utilizes NFC, WLAN, or any other communication link may be developed to aid the consumer in a retail outlet and additionally aid a retailer in relaying information to the consumer. For example, prior to entering a retail outlet, a consumer may list the particular products which they plan to purchase while at the retail outlet. Further, upon entering a retail outlet, the consumer may receive a promotional offer from the retail outlet for one or more particular products they plan to purchase.

Some implementations are generally directed to adapt tracking of a product package via a embedded conductive ink tag, NFC tag, or RFID tag of a product package. Each embedded tag relates a unique product identifier to a product package with at least one of a serial number, product-related environmental data, and sales verification transmitted between a NFC shelf display, a product package display and a database of unique product identifiers. For example, a consumer in a retail outlet may use a consumer application on a consumer operated external device to request the location of a particular product and receive a personalized message from a database of unique product identifiers on the consumer operated external device detailing the location of said particular product. In some implementations, the personalized message may also appear on a NFC shelf display to aid a consumer in locating said particular product. For example, the smart retail display system can include a shelf control system which is operably in communication with a user display device to receive a location request information command, the shelf control system operable to send a command to the shelf display to illuminate thereby locating the requested product by the consumer.

This method and other implementations of technology disclosed herein may each optionally comprise one or more of the following features.

A product package that includes a embedded conductive ink tag, NFC tag, or RFID tag may provide a method of retail theft detection. For example, a NFC or RFID tag reader may be placed at the exit of a retail outlet and communicate with a database of unique product identifiers to detect the theft of a product by sounding a alarm beacon to alert a retailer that a particular product does not have registered sales verification.

Additionally, a retail theft detection system may detect theft at a retail outlet not only by a consumer, but also by a retail employee at the retail outlet. For example, tracking sales allows a retailer to determine the amount of product sold and the corresponding dollar amount sold in real-time. If the retail employee were to steal money from a cash register at a point of sale, then the retailer would know which cash register at the point of sale the money was stolen from once the cash in the register is found to be less than the amount recorded in a database.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein. Those of ordinary skill in the art will better appreciate the features and aspects of such embodiments, and other, upon review of the remainder of the specification.

The term "data" may denote information pertaining to: conductive ink tag, NFC tag, or RFID tag; product-related information such as environmental conditions, location, content or any other related information associated with or meant as a descriptor for the product, product condition, content, source or any other related information including origin, produce information such as nutritional information, related origin information such as facility or farm; packaging content and materials; unique product identifier serial numbers; and sales verification. The term "data" is not meant to be limiting as disclosed herein in the various examples.

The term "database" may denote a storage mechanism that allows for the manipulation of data and may be located on a personal computer, server either remote or local, laptop, and/or a tablet. The term "database" is not meant to be limiting as disclosed herein.

The term "product" may denote any item sold at various retail outlets. The term "product" is not meant to be limiting as disclosed herein.

The term "command" may denote electrical signals transmitted between various apparatus described herein and can include instructions, programs, computer communications and any other electronic, digital communication or analog signal. The term "command" is not meant to be limiting as disclosed herein.

The term "transponder antenna" may denote an electronic device that serves as a receiver or transmitter and upon reception of an electronic signal, transmits a signal to various apparatus in the system. The term "transponder antenna" is not meant to be limiting as disclosed herein and may further include communication links including transmitters, receivers, transceivers, RF interrogators or other communication hardware and/or software for exchange of information through any form, either wirelessly or wired. This can include passive or active communication links, exchange of digital or analog communications and the like.

The term "smart" may denote any apparatus of the system, wherein the apparatus is equipped with electrical components that may be, but is not limited to: a conductive ink tag, NFC tag, or RFID tag; a plurality of sensors; and a transponder antenna. The term "smart" is not meant to be limiting as disclosed herein.

Other implementations may include an implementation of the method and systems described herein on a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

In various embodiments, the smart retail display system may include at least one near field communication retail shelf, at least one near field communication shelf display connected to the near field communication retail shelf by at least one communication link, at least one product package location on the near field communication retail shelf, a near field communication shelf control system having a memory, a processor, and at least one communication link, wherein the near field communication shelf control system transmits display information to the near field communication shelf display; and at least one product package having a product package display with a communication link, wherein the near field communication shelf control system is in communication with the product package display through the communication link.

In some variations, the display system may include at least one unique product identifier related to a conductive ink tag, a near field communication tag, or a radio-frequency identification tag. In other implementations, the system may have a product package display and a near field communication shelf display which is a liquid crystal display, an active-matrix organic light-emitting diode display, or a light-emitting diode display.

Other aspects may include a product package that includes a plurality of sensors. Or may have a plurality of sensors which have at least one of a temperature sensor, a humidity sensor, and a timing sensor.

In some aspects, the control system may include a memory to store product-related environmental data to be collected and stored in a database of unique product identifiers communicated through the at least one communication link on the product package or the product package display. The database of unique product identifiers may also include at least one of a serial number, product-related environmental data, and sales verification for each of the at least one smart product package and may be located on a server, a personal computer, a laptop, and/or a tablet.

In other variations and aspects, the product package may include at least package open sensor, the at least one package open sensor operably in communication with the shelf control system. As well, the shelf may further include a plurality of sensors which may be at least one of a motion detector or a pressure detector. The shelf may, in some instances, be operable to transmit a command to the near field communication control system.

In still other variations of the systems and methods described herein, the smart retail display system may comprise at least one near field communication retail shelf; at least one near field communication shelf display connected to the near field communication retail shelf, both the retail shelf and the shelf display having at least one communication link; at least one product package location on the near field communication retail shelf; a near field communication shelf control system having a memory, a processor, and at least one communication link, wherein the near field communication shelf control system transmits display information to the near field communication shelf display; wherein the near field communication shelf control system receives a product location request from a consumer, the shelf control system in response to the product location request is operable to identify the location related to the location request and transmit to the retail shelf display a unique display message.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE PREFERRED EMBODIMENTS

Figure 1:
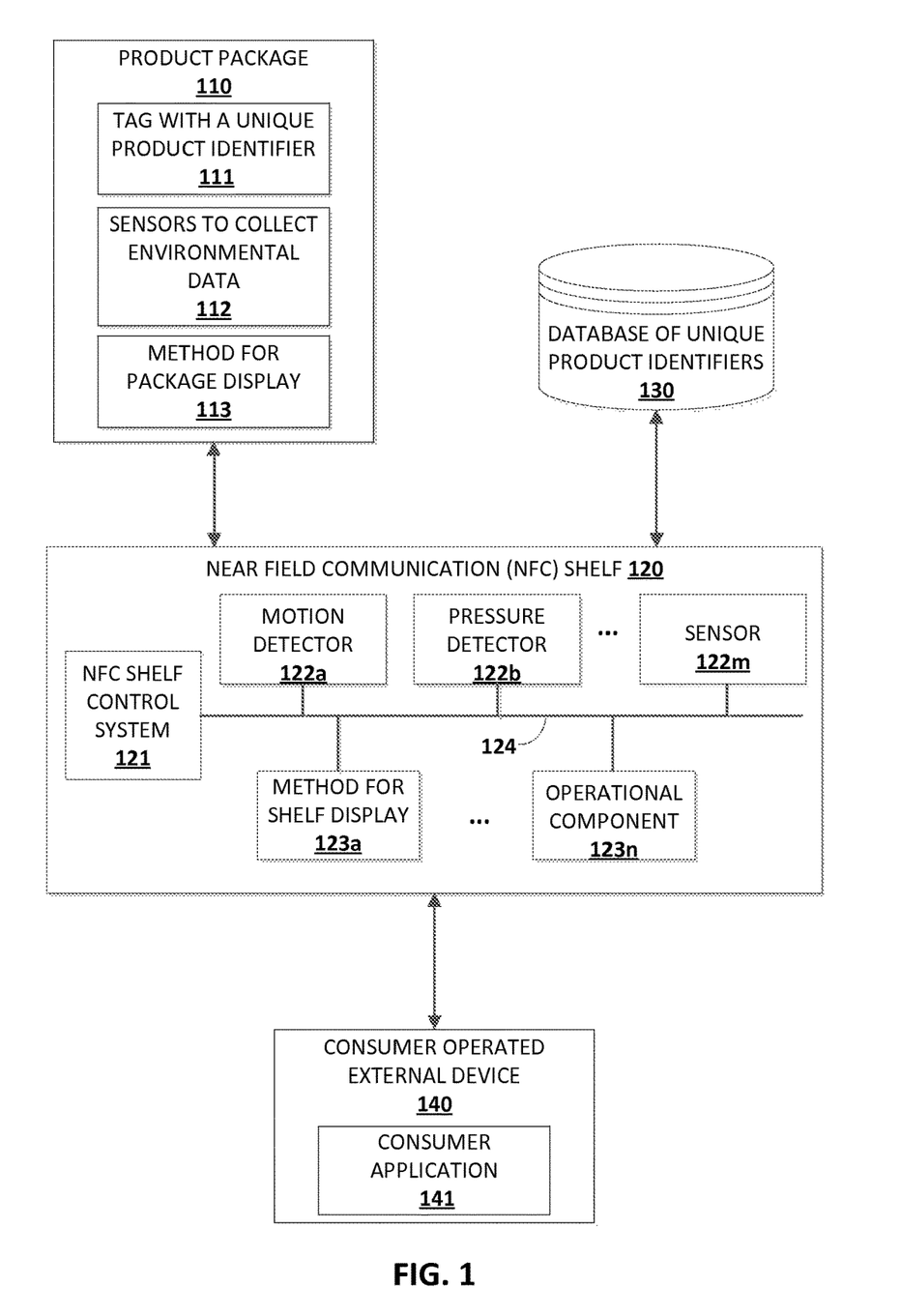
FIG. 1 is a block diagram of electronic components of a smart retail display system.

FIG. 1 illustrates various and alternative components of a smart retail display system described more fully herein. In this particular embodiment, a smart near field communication (NFC) shelf 120 (referred to hereinafter as a smart NFC shelf or simply NFC shelf) serves as a product support and communication link to transfer data between a smart product package 110 (referred to hereinafter as a product package), a database of unique product identifiers 130, and a consumer operated external device 140 via NFC, wireless local area network (WLAN), or any other communication link. NFC shelf control system 121 may be comprised of: a memory to store one of a plurality of commands or instructions for the system to execute; a controller which may be, but is not limited to a microprocessor to execute the stored plurality of commands or instructions in the memory; and a transponder antenna or other communication link integrated electronically therewith to facilitate transmission of data between the product package 110, the NFC shelf 120, the database of unique product identifiers 130, and the consumer operated external device 140 as needed or required by design or operational functionality.

NFC control system 121 typically operates under the control of a microprocessor or microcontroller and executes various software and firmware applications. The software of the microprocessor or microcontroller typically comprise one or more commands that reside at various times in various memory and storage devices in a smart retail display system. Moreover, while the embodiments have and hereinafter will be described in the context of fully functioning programmable electronic devices, those skilled in the art will appreciate that various implementations are capable of being replicated in a variety of forms, and that the description applies equally regardless of the type of signal or transmission bearing media used to carry out the distribution of information described herein.

A NFC shelf control system 121 may interface with both sensors 122a-122m and operational components 123a-123n of NFC shelf 120 by a communication bus 124 which may be either a wired or wireless connection. The sensors of NFC shelf 120 may be for example, but are not limited to, a motion or location detector 122a and a pressure detector 122b. The various exemplary components of an NFC shelf 120 may be, but are not limited to a method for shelf display 123a such as a liquid crystal display (LCD), a active-matrix organic light-emitting diode (AMOLED) display, a light-emitting diode (LED) display, or any other display commonly used in the art to display images and/or messages specified by a retailer, from either an in-house or remote location.

A product package 110 may include three or more components that may be, but are not limited to a tag 111 which may have a unique product identifier, a plurality of sensors to collect product-related data 112 such as for example environmental data (referred to hereinafter as sensors to collect environmental data), and a smart package display 113 (referred to hereinafter as a package display). The tag 111 may have or be associated with a unique product identifier and may be a conductive ink tag, NFC tag, or radio-frequency identification (RFID) tag and may be used by the control system or associated hardware and software to associate collected data with a particular product package on the shelf or located elsewhere. The plurality of sensors to collect environmental data 112 may include at least a temperature sensor, a humidity sensor, and a timing sensor, the various characteristic or data values of which may be communicated to the control system or element thereof. In various examples, the sensor data collected may be received by the NFC Control System and retained as related to the environmental conditions along a particular shelf 120. Further, products which are located along the particular shelf may be associated with such data stored by the control system. One or all of the plurality of sensor data may be displayed on the product package 110 for a consumer to examine or for general informational purposes. The package display 113 may utilize a LCD, a AMOLED display, a LED display, or any other display commonly used in the art to display product package 110 information and personalized image(s) and/or message(s) specified by a retailer as communicated to the package either by the control system or as determined by the package display.

A database of unique product identifiers 130 stores information about product package 110 and enables a retailer to command the transmission of messages and/or images to both product package 110 and smart NFC shelf display 302 (referred to hereinafter as a smart NFC shelf display or simply NFC shelf display) via NFC, WLAN, or any other communication link. By communication link it is meant that any device having a communication link may be in digital or other communication with any other part of the system via a wireless or wired communication protocol. Such communication link can be active or passive. In some implementations, a database of unique product identifiers 130 will be located at a retail outlet for analysis of data. In some implementations, a database of unique product identifiers 130 will be located at a remote location for analysis of data. Regardless of location, a database of unique product identifiers 130 may be, but is not limited to storage accessible and/or controllable by a server, personal computer, a laptop, and/or a tablet and allows a retailer to analyze and sort real-time product data ranging from inventory data to sales data.

A consumer operated external device 140 may be any device operated by or used by a consumer such as a smartphone, a smart watch, a tablet or any device that utilizes NFC, WLAN, or any other communication link. Said consumer operated external device may have a consumer application 141 which enables a consumer to create a list of desired products prior to entering a retail outlet 600, locate a product package 110 within a retail outlet 600, receive promotional offers or personalized messages from a retailer, etc.

Although the blocks, flow charts, and perspective views are depicted in particular ways, one of skill in the art will recognize that blocks, operations, and elements may be added, omitted, and/or rearranged and modified to achieve the same ends. The embodiments depicted are for illustrative purposes and are not meant to be limiting.

Figure 2:
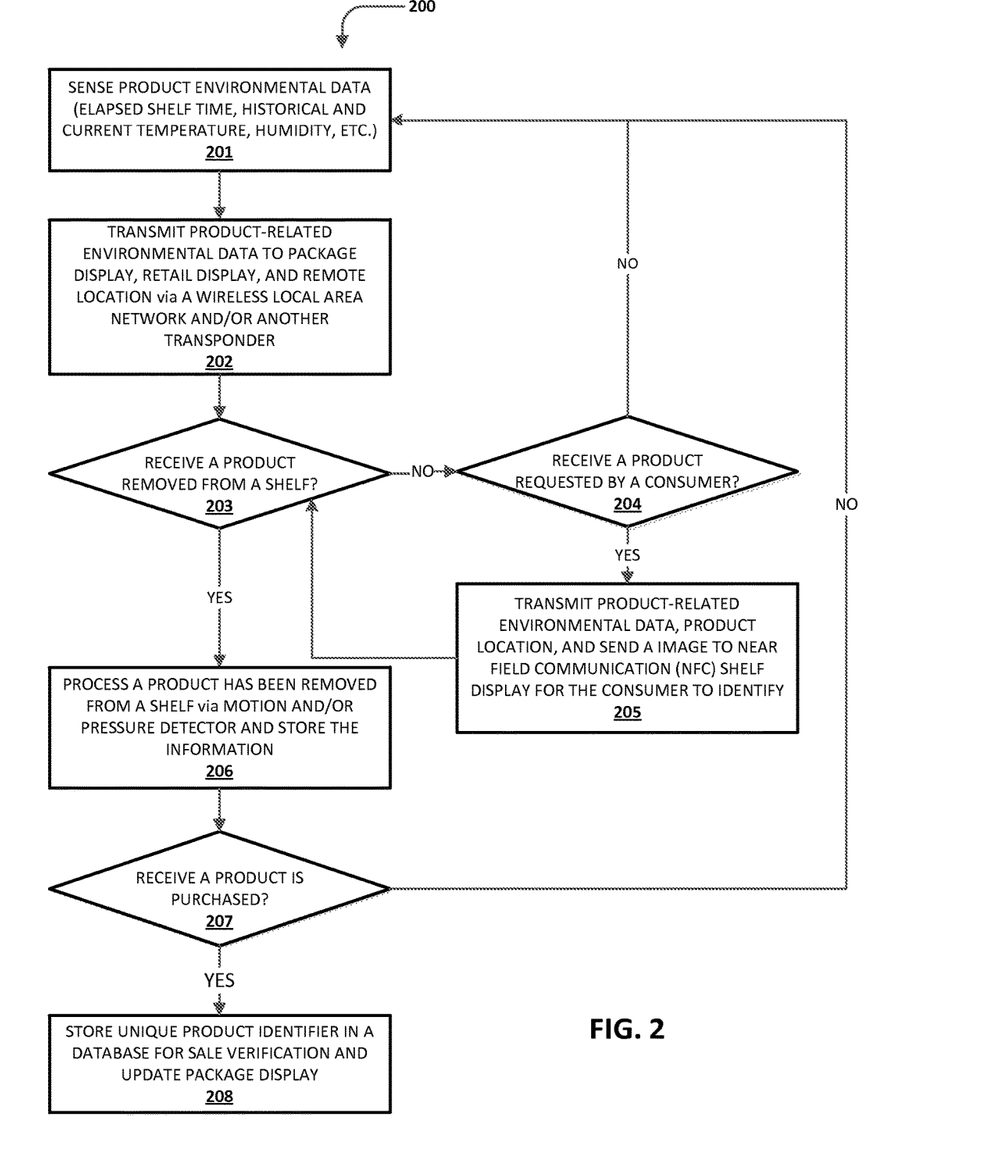
FIG. 2 is a flow chart illustrating an exemplary sequence of operations for a smart retail display system.

FIG. 2 illustrates a flow routine 200 of an exemplary process for a retail display method which represents the primary sequence of operations commanded by a near field communication (NFC) shelf control system 121 for implementing the functionality described herein. In some embodiments, routine 200 begins in block 201 by sensing environmental data of a product package 110. In some implementations, this environmental data is collected, analyzed, and stored locally and in other implementations, this data is collected, analyzed, and stored remotely. Such data may be processed at a location remotely positioned from the NFC shelf control system and also may be transmitted via NFC, WLAN, or any other communication link to a database of unique product identifiers 130 in block 202 for association with the various products and locations. In another embodiment, block 203 may be utilized to determine whether a product package 110 is removed from a NFC shelf 120 via a motion detector 122a, a pressure detector 122b, and/or another sensor 122m. Alternatively, when a product has not been removed by a customer from a shelf, it may be that a customer is requesting information about a particular product such as any collected or available data and/or location on the product. It may be determined at block 204 that a product is being requested by a consumer application 141 from a consumer operated external device 140. If a product is not requested by a consumer, the sequence of operations returns to block 201 and the process begins anew.

If a product is being requested by a consumer in block 204, then product environmental data, product location, and/or an image is transmitted to display on a NFC shelf display 302 in block 205 so that it may be readily viewable by the consumer associated with the request. If it is determined a product is removed from a NFC shelf 121 in block 203, block 206 processes the removal of a product package 110. It is then determined in block 207 if the removed product package 110 is purchased by a consumer. Such determination can be made by additional sensors located at payment locations, interrogation sensors or other devices which would map the location of the product to a checkout or other payment station. If so, sale verification is registered for the associated unique product identifier in database 130 is stored in block 208. If the removed product is not purchased, the control system may log the misplaced product (via the unique identifier) in the database as missing and the sequence of operations returns to block 201.

Figure 3:
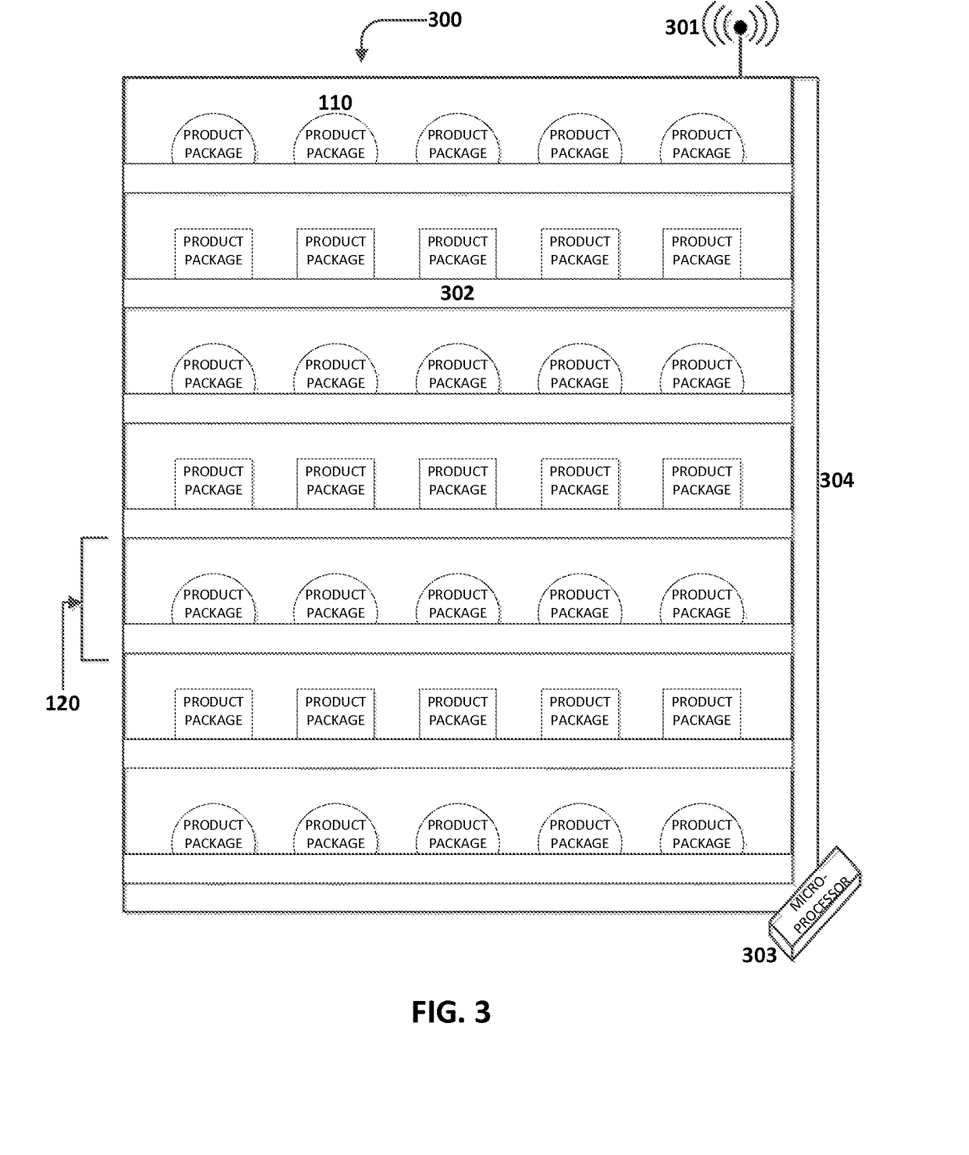
FIG. 3 is a perspective view of a near field communication shelf that employs a smart retail display system of FIG. 1 and FIG. 2.

FIG. 3 illustrates an embodiment of a perspective view of a plurality of NFC shelves 300 incorporating a smart retail display system. A plurality of NFC shelves 300 includes an NFC, WLAN, or other wireless communications antenna or transmitter/receiver 301 to communicate with an interrogated product package 110, an associated and networked database of unique product identifiers 130, a consumer operated external device 140 and/or a plurality of NFC shelves 300. Of course, it is understood that each of these elements could be collectively in communication with a network controller or other wirelessly connected server system which collates the information and directs the flow of data and information from and to the appropriate location and/or electronic device. Each NFC shelf 120 may be coupled to and/or associated with a plurality of product packages and an NFC shelf display 302 to provide a consumer with an image(s) and an indication(s) which may include, but is not limited to relaying general product information, promotional offers, and product location. One or more product package(s) 110 is coupled to a corresponding NFC shelf 120 via NFC, WLAN, or any other communication link signals to facilitate the transfer of data between components. By indicating that an item or aspect described herein is coupled with another element, it is meant that the control system or the item itself is associated therewith or thereto. For example, in some embodiments products having a product package 110 may be sensed on a shelf 120 and the sensors or other devices may detect the location of the unique product on the shelf. Such location of a unique product may be stored in the database for inventory, location or other purposes. Such product location may also be associated with sensor data from nearby environmental sensors and display shelf 302, all of which are integrated together by the control system, in various examples. A plurality of NFC shelves 300 are equipped with a central processing unit (CPU) that may be, but is not limited to a microprocessor 303. Microprocessor 303 is coupled or associated with various support or networking architecture, such as one or more NFC shelves 120, a receiver, transmitter, transponder 301 via communication bus 304 or other data transfer method. Microprocessor 303 may control the collection, transmission, and storage of environmental data of one or more product packages from a plurality of sensors, and may control the display of personalized image(s) or message(s) for one or more product package 110, may control the display of personalized image(s) or message(s) for one or more NFC shelf display 302, and may control the transfer of product information between a database of unique product identifiers 130 via transmitter/receivers (collectively antennae) 301.

Figure 4:
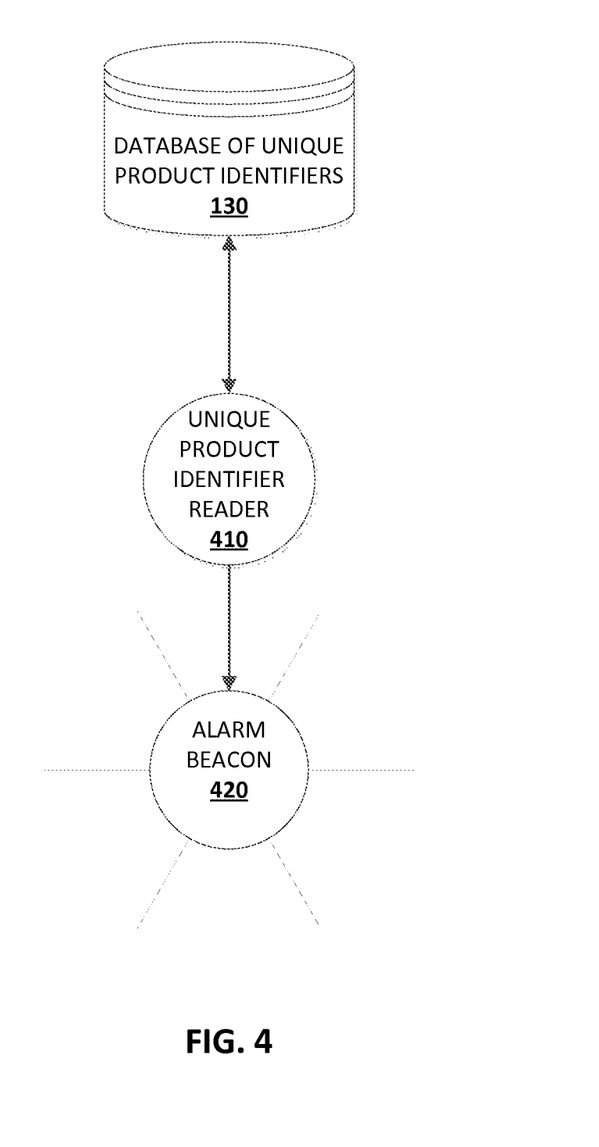
FIG. 4 is a block diagram of electronic components of a retail theft detection system.

FIG. 4 sets forth various alternative electronic components of a retail theft detection system. In this particular embodiment, a unique product identifier reader 410 serves to transfer data between a database of unique product identifiers 130 via NFC, WLAN, or any other communication link and to transfer data to an alarm beacon 420 to alert a retailer a theft has occurred. The reader/tag system may be one of a passive reader active tag (PRAT) system, an active reader passive tag (ARPT), or an active reader active tag (ARAT) discussed hereinbefore and reads the conductive ink tag, NFC tag, or RFID tag associated with each product by detecting sale verification of each individual product package 110 purchased by a consumer.

Although the blocks, flow charts, and perspective views are depicted in particular ways, one of skill in the art will recognize that blocks, operations, and elements may be added, omitted, and/or rearranged to achieve the same ends. The embodiments depicted are for illustrative purposes and are not meant to be limiting.

Figure 5:
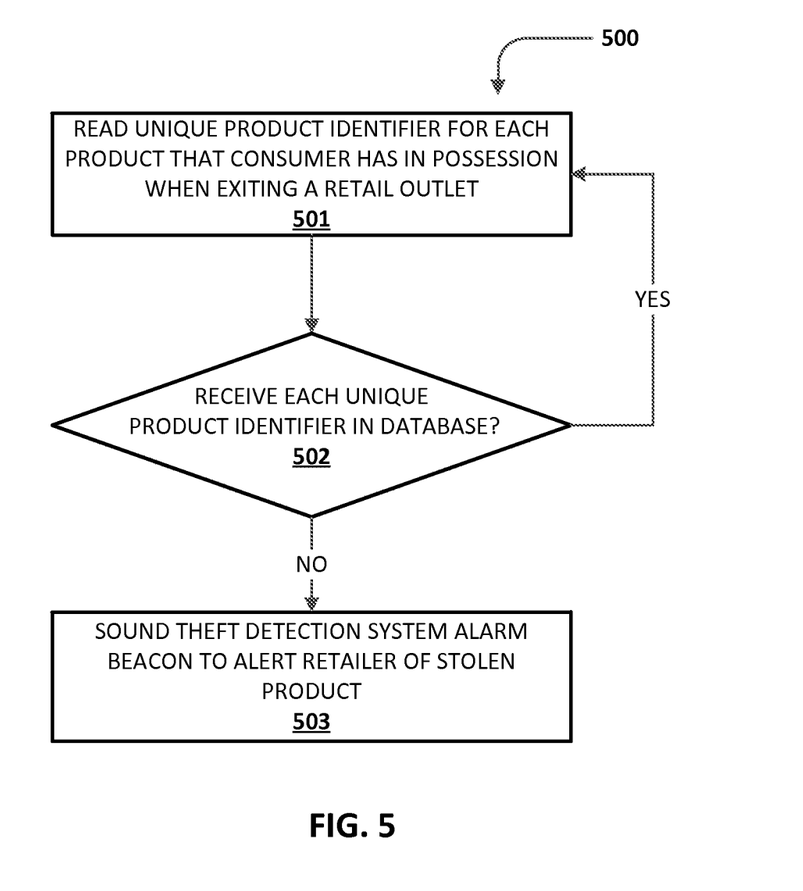
FIG. 5 is flow chart illustrating an exemplary sequence of operations for a retail theft detection system.

Routine 500 of FIG. 5 illustrates an exemplary process for a retail theft detection method and begins in block 501 by reading (through the transmitter/receivers positioned throughout a retail establishment, for example) each tag with a unique product identifier 111 of each product package 110 in possession of a consumer via unique product identifier reader 410. Next, block 502 verifies if a consumer exiting a retail outlet possesses a product package 110 that does not have registered sales verification in a database of unique product identifiers 130, such as for example the product with the unique product identifier was detected near or at a sales register or interrogated by a scanner system at a register. If a consumer exits a retail outlet 600 with a product package 110 that does not have registered sales verification, a theft detection alarm beacon 420 will sound and a retailer will be alerted a theft has occurred in block 503. If all product package(s) 110 possess sale verification, the sequence of operations returns to block 501 and the process repeats. Alternatively, or in addition to such exit or departure, the system in various examples could include a smart package which may detect, through a tear or break in the package display 113 or other 'package open' sensor on the package 110. These could include a pressure sensor, continuity circuit or other device which could detect the opening of the product packaging and/or removal of the product, at which time the interrogated sensor would transmit to the control system a signal that the package has been opened or that the product has been removed from the packaging. Thus the package 110 could have an active transceiver with coordinated logic and power supply to identify such condition and transmit data as needed or alternatively modify data for interrogation by RFID or other simile active/passive interrogation techniques. The system could then update the status of the unique product associated with the identifier to a PACKAGE OPEN or other condition as needed.

Figure 6:
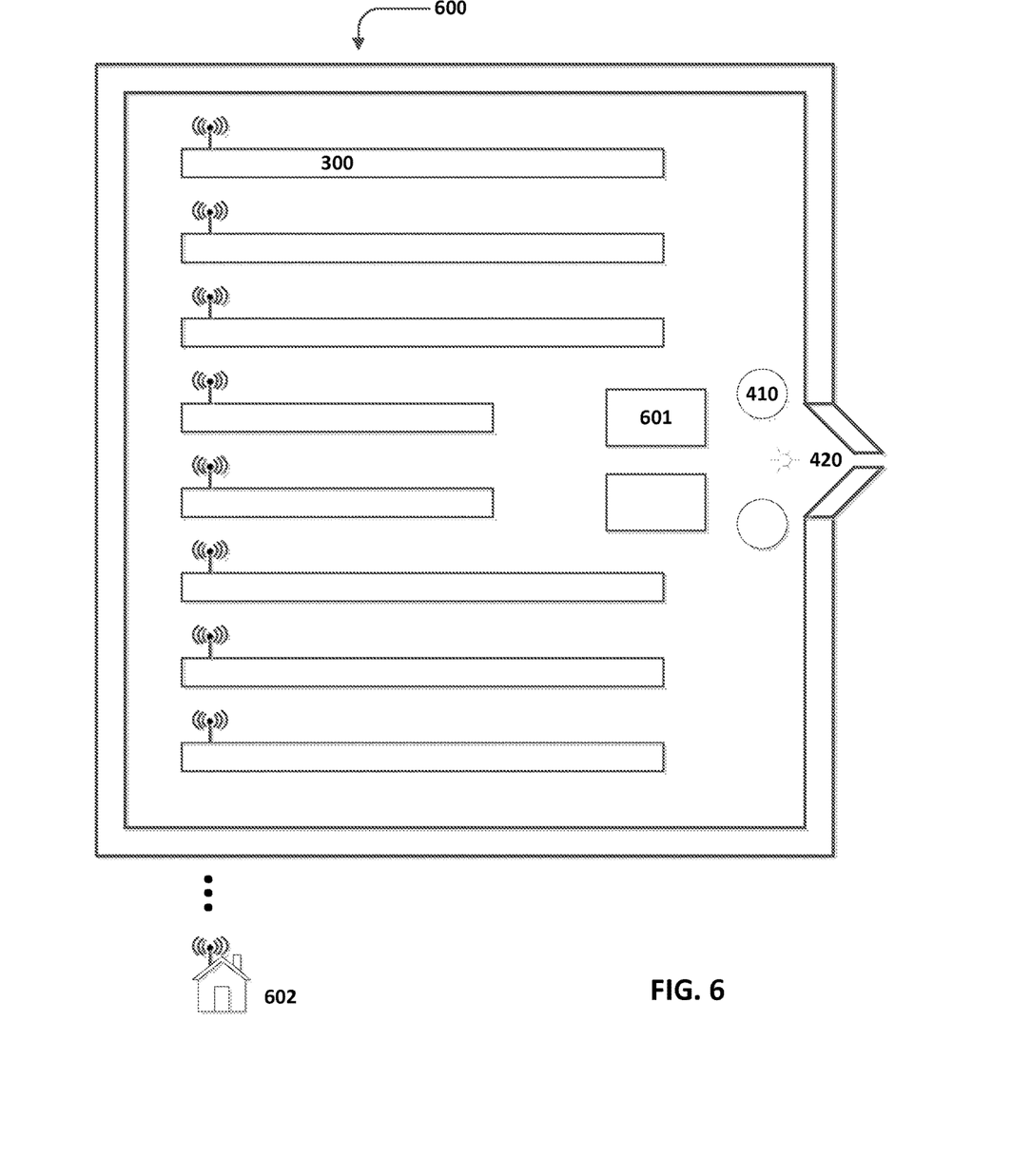
FIG. 6 is a perspective view of a retail outlet that employs a retail theft detection system of FIG. 4 and FIG. 5.

FIG. 6 illustrates a perspective view of a retail outlet 600 with a plurality of perspective view 300 incorporating a retail theft detection system consistent with the description herein. The point of sale 601 is a location a consumer purchases a product package 110 to transmit sale verification to a database of unique product identifiers 130. As a consumer exits a retail outlet 600, a unique product identifier reader 410 cross-references one or more product package(s) 110 in possession of the consumer with a database of unique product identifiers 130. If one or more product package 110 in a consumer's possession is not verified as sold, alarm beacon 420 will alert a retailer of a theft. If all of one or more product package(s) are verified as sold, then a unique product identifier reader 410 waits for the next consumer to exit. A database 130 of unique product identifiers is located either at a retail outlet or at a remote location 602 which processes the data and information collected by both a smart retail display system and a retail theft detection system.

Many modifications and other embodiments of the described system embodiments will come to mind to one skilled in the art to which this pertains having the benefit of the teachings presented in the foregoing description. Therefore, it is to be understood that it is not to be limited to the specific embodiments disclosed and that modifications and other embodiments are intended to be included within the scope of the appended claims. Although specific terms are employed herein, they are used in a generic and descriptive sense only and not for purposes of limitation.

Several implementations have been described and illustrated herein and a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:
1. A smart retail display system, comprising:
   at least one near field communication retail shelf;
   at least one near field communication shelf display connected to the near field communication retail shelf by at least one communication link;
   at least one product package location on the near field communication retail shelf;

a near field communication shelf control system having a memory, a processor, and at least one communication link, wherein the near field communication shelf control system transmits display information to the near field communication shelf display; and at least one product package having a product package display with a communication link;

wherein the near field communication shelf control system is in communication with the product package display through the communication link;

wherein the at least one product package includes a at least one sensor operable to collect environmental data associated with the at least product package, the at least one sensor in communication with a processor having associated memory operable to:

store the collected environmental data communicated from the at least one sensor in a database of unique product identifiers; and, store a sales verification for each of the at least one product package in the database of unique product identifiers.

2. The smart retail display system of claim 1, wherein the at least one product package includes at least one unique product identifier related to a conductive ink tag, a near field communication tag, or a radio-frequency identification tag.

3. The smart retail display system of claim 1, wherein the product package display and the near field communication shelf display is a liquid crystal display, an active-matrix organic light-emitting diode display, or a light-emitting diode display.

4. The smart retail display system of claim 1, wherein the at least one sensor include at least one of a temperature sensor, a humidity sensor, and a timing sensor.

5. The smart retail display system of claim 1, wherein the database of unique product identifiers is located on a personal computer, a laptop, and/or a tablet.

6. The smart retail display system of claim 1, wherein the product package includes at least package open sensor, the at least one package open sensor operably in communication with the shelf control system.

7. The smart retail display system of claim 1, wherein the near field communication retail shelf includes a plurality of sensors.

8. The smart retail display system of claim 7, wherein the plurality of sensors includes at least one of a motion detector or a pressure detector.

9. The smart retail display system of claim 7, wherein the retail shelf is operable to transmit a command to the near field communication control system.

10. A smart retail display system, comprising:
at least one near field communication retail shelf including a plurality of sensors and at least one near field communication shelf display operably connected to the at least one near field communication retail shelf, both the retail shelf and the shelf display having a communication link;
at least one product package including a plurality of sensors operably in communication with a product package display by a communication link;
wherein the plurality of sensors are also operatively in communication with a memory and operable to collect environmental data associated with the at least product package, the memory operable to:
store the collected product-related environmental data communicated from the plurality of sensors in a database of unique product identifiers; and,
store, in the database of unique product identifiers, a sales verification for each of the at least one smart product package;
a near field communication shelf control system having a memory, a processor, and at least one communication link, wherein the near field communication shelf control system is operable to transmit display information to the shelf display and the product package display;
wherein, the near field communication shelf control system is operable to dynamically update the shelf display and the product package display through the at least one communication link.

11. The smart retail display system of claim 10 wherein the near field communication shelf display and the product package display include one of a liquid crystal display, an active-matrix organic light-emitting diode display, or a light-emitting diode display.

12. The smart retail display system of claim 10 wherein the plurality of sensors of the near field communication shelf include at least one of a motion detector or a pressure detector.

13. The smart retail display system of claim 10 wherein the plurality of sensors of the product package include at least a temperature sensor, a humidity sensor, and a timing sensor to provide the near field communication shelf control system with product-related environmental data and time data.

14. The smart retail display system of claim 10 wherein the near field communication shelf display is configured to be dynamically updated in response to data received by the near field communication shelf control system from the plurality of sensors as product-related environmental data updates and time data updates through the at least one communication link.

15. The smart retail display system of claim 10 wherein the product package display is configured to be dynamically updated by the near field communication shelf control system in response to data received regarding product-related environmental data updates and as time data updates from the plurality of sensors through the at least one communication link.

16. The smart retail display system of claim 10 wherein the product package display is configured to display product-related environmental data collected by the plurality of sensors of the product package display.

17. The smart retail display system of claim 10 wherein the shelf control system is operably in communication with a user display device to receive a location request information command, the shelf control system operable to send a command to the shelf display to illuminate.

18. A smart retail display system, comprising:
at least one near field communication retail shelf including a plurality of sensors;
at least one near field communication shelf display connected to the near field communication retail shelf, both the retail shelf and the shelf display having at least one communication link;
a plurality of product package locations on the near field communication retail shelf, each product package location configured to receive a product package having a product package display and an associated communication link;
a near field communication shelf control system having a memory, a processor, and at least one communication link, wherein the near field communication shelf control system transmits display information to the near field communication shelf display;

wherein the near field communication shelf control system is operable to receive data from the plurality of sensors;
wherein the near field communication shelf control system is operable to:
   receive a product location request from a consumer, and in response to receiving the product location request, identify the location related to the location request;
   detect, through at least one of the plurality of sensors, that a product package has been removed from the product package location; and,
responsive to the detection:
   transmit, to the removed product package a unique display message for display on the display of the removed product package; and
   register the removal of the removed product package in a database of unique product identifiers,
wherein the near field communication shelf control system if further operable to register, in the database of unique product identifiers, a sales verification.

\* \* \* \* \*